(12) United States Patent
Yen (10) Patent No.: US 11,313,970 B2
(45) Date of Patent: Apr. 26, 2022

(54) TIME OF FLIGHT CAMERA

(71) Applicant: GUANGZHOU LUXVISIONS INNOVATION TECHNOLOGY LIMITED, Guangzhou (CN)

(72) Inventor: Shih-Chieh Yen, New Taipei (TW)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 0 days.

(21) Appl. No.: 17/113,121

(22) Filed: Dec. 7, 2020

(65) Prior Publication Data

US 2021/0181345 A1 Jun. 17, 2021

(30) Foreign Application Priority Data

Dec. 17, 2019 (CN) .......................... 201922270742.7

(51) Int. Cl.
*G03B 21/20* (2006.01)
*G01S 17/89* (2020.01)

(52) U.S. Cl.
CPC ............ *G01S 17/89* (2013.01); *G03B 21/208* (2013.01); *G03B 21/2033* (2013.01)

(58) Field of Classification Search
None
See application file for complete search history.

(56) References Cited

U.S. PATENT DOCUMENTS 5,892,610 A * 4/1999 Rolfe .................. G02B 27/642
359/198.1
2011/0310356 A1* 12/2011 Vallius .................. G03B 33/06
353/31

FOREIGN PATENT DOCUMENTS

CN      101673036 A  *  3/2010
JP      2019032815 A  *  2/2019  .............. B60L 53/53
JP      2020144048 A  *  9/2020

* cited by examiner

*Primary Examiner* — Michelle M Iacoletti
*Assistant Examiner* — Danell L Owens (57) ABSTRACT

The present disclosure provides a time-of-flight camera, comprising a light-emitting module and a light-receiving module. The light-emitting module comprises a light source component, a light-reflecting component, and a light-diffusing component. The light source component emits a first light in a first direction. The light-reflecting component and the light-diffusing component are disposed on the light path of the first light. A second light formed by the first light passes through the light-reflecting component and the light-diffusing component. The second light travels toward a second direction to an object to be measured. The object to be measured reflects the second light. The first direction is intersecting with the second direction. The light-receiving module receives the reflected second light and performs the function of sensing.

9 Claims, 6 Drawing Sheets

TIME OF FLIGHT CAMERA

CROSS-REFERENCE TO RELATED APPLICATION

This application claims the priority benefit of Chinese Patent Application Serial Number 201922270742.7, filed on Dec. 17, 2019, the full disclosure of which is incorporated herein by reference.

BACKGROUND

Technical Field

The present disclosure relates to the technical field of camera devices, particularly to a time-of-flight camera using a light-diffusing component to uniformize the intensity of projected light.

Related Art

At present, methods for measuring the depth of three-dimensional images are mainly the three-dimensional structured light measurement and the time-of-flight measurement, etc. The three-dimensional structured light measurement is a method first to project scattered spots or a code pattern then obtain the depth of the photographed object by matching with feature points. The time-of-flight measurement is a method first to use the phase difference between the projected light and the received light for the calculation of the flight time of the light between the camera and the object, then the flight time is used for the calculation of the distance between each of the points on the object and the camera, and finally the depth of each of the points on the object can be calculated. Since the method of three-dimensional structured light measurement requires a clear reflection image for measurement, objects to be measured should be within a certain distance which is not far. Objects in a farther distance could be measured by the method of time-of-flight measurement as it measures the phase difference between projected light and received light.

However, concerning the cameras for time-of-flight measurements, as the light from which having a small beam angle, the light in some areas is highly intense, while in other areas are low, resulting in uneven intensity of the projected light on the entire illuminated surface. Thus, for objects that are farther, the intensity of the reflected light is relatively low at where the intensity of the projected light is low, so the received light cannot be accurately measured.

SUMMARY

The embodiments of the present disclosure provide a time-of-flight camera to solve the problem of incomplete or inaccurate measurement results caused by uneven light intensity of conventional time-of-flight cameras.

The present disclosure provides a time-of-flight camera, comprising a light-emitting module and a light-receiving module. The light-emitting module comprises a light source component, a light-reflecting component, and a light-diffusing component. The light source component emits a first light in a first direction. The light-reflecting component and the light-diffusing component are disposed on the light path of the first light. A second light formed by the first light passes through the light-reflecting component and the light-diffusing component. The second light travels toward a second direction to an object to be measured. The object to be measured reflects the second light. The first direction is intersecting with the second direction. The light-receiving module receives the reflected second light and performs the function of sensing.

In the embodiments of the present disclosure, by installing a light-diffusing component in the light path of the projected light, the intensity of the first light from the light source component can be uniformized after being diffused by diffuser. Thus, the problem of uneven intensity of the projected light of conventional time-of-flight cameras can be handled, allowing the measurement result to be comprehensive and accurate for possible measurements on farther objects.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/ substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
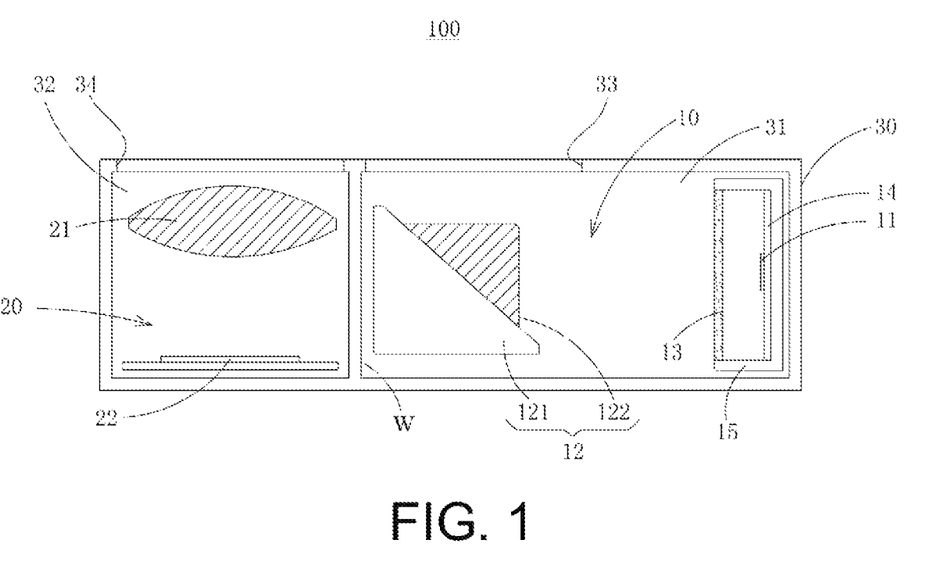
FIG. 1 is a schematic diagram of the structural configuration of a time-of-flight camera of the first embodiment of the present disclosure.
Figure 2:
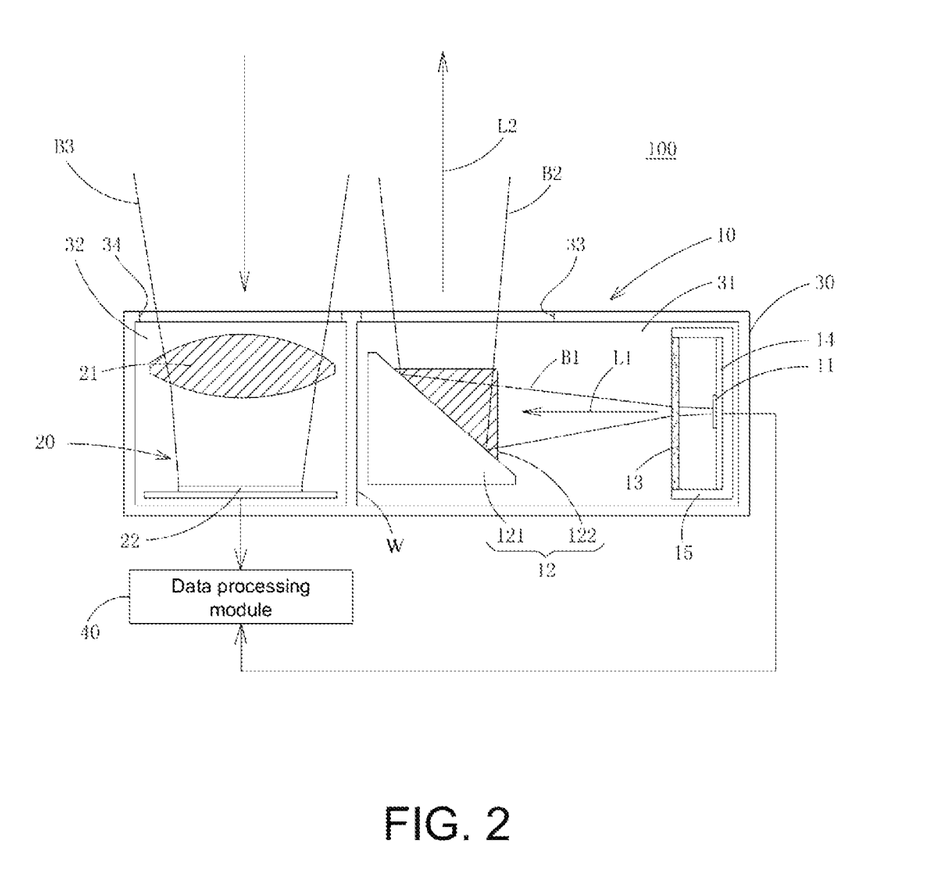
FIG. 2 is an operation status diagram of the time-of-flight camera in FIG. 1.

FIG. 1 is a schematic diagram of the structural configuration of a time-of-flight camera of the first embodiment of the present disclosure. FIG. 2 is an operation status diagram of the time-of-flight camera in FIG. 1. As shown in the figures, this embodiment provides a time-of-flight camera 100 comprising a light-emitting module 10 and a light-receiving module 20. Light is emitted from the light-emitting module 10 to the object to be measured, then is reflected by the object to be measured and finally enters the light-receiving module 20. By calculating the phase difference between the emitted light and the received light, the travel time of the light can be calculated, and hence the distance of each of the points on the object to be measured can be calculated to measure the depth of each of the points on the object to be measured. Finally, by simulation, a three-dimensional image can be obtained.

The light-emitting module 10 and the light-receiving module 20 are disposed in a housing 30, forming an emitting module accommodating space 31 and a receiving module accommodating space 32 separated by a partition wall W. A light-emitting opening 33 is provided on the housing 30 at a position corresponding to the emitting module accommodating space 31, and a light-receiving opening 34 is provided on the housing 30 at a position corresponding to the receiving module accommodating space 32.

The light-emitting module 10 comprises a light source component 11, a light-reflecting component 12, and a light-diffusing component 13. The light source component 11 emits a first light B1 toward a first direction L1. After the first light B1 passes through the light-diffusing component 13, it is scattered by the light-diffusing component 13 to form a beam having uniform intensity. The beam with uniform intensity is then reflected by the light-reflecting component 12 to form a second light beam B2, which travels in a second direction L2 and leaves the light-emitting module 10 through the light-emitting opening 33 until it reaches the object to be measured. In this embodiment, the light source component 11, the light-reflecting component 12, and the light-diffusing component 13 are disposed in the emitting module accommodating space 31 of the housing 30. The light source component 11 is installed on a base plate 14, the light source component 11 and the base plate 14 are disposed in a container 15, and the light-diffusing component 13 is disposed at the opening of the container 15. The container 15, the light source component 11, and the light-diffusing component 13 are disposed at a position in the emitting module accommodating space 31 close to the housing 30 and meanwhile on the opposite side of partition wall W. The light-reflecting component 12 is adjacent to the light-emitting opening 33 of the housing 30 and is adjacent to the partition wall W of the housing 30. In another embodiment, the container 15, the light source component 11, and the light-diffusing component 13 could also be disposed at a position adjacent to the partition wall W of the housing 30, the light-reflecting component 12 is disposed at a position in the emitting module accommodating space 31 where the position is close to the wall surface of the housing 30 and is opposite to the partition wall W, and the light-emitting opening 33 corresponds to the position of the light-reflecting component 12. The positions of the container 15 and the light-reflecting component 12 are not limited, as long as the light path of the light-emitting module 10 passes through the light-diffusing component 13 and the light-reflecting component 12 and then passes through the light-emitting opening 33 of the housing 30.

In this embodiment, the light-diffusing component 13 is disposed on the light path of the first light B1 between the light source component 11 and the light-reflecting component 12, and the first light B1 first passes through the light-diffusing component 13 and then the light-reflecting component 12. The light-diffusing component 13 does not need to be limited to be disposed at the opening of the container 15, as long as it is on the light path of the first light B1. In this embodiment, the first direction L1 and the second direction L2 intersect, that is, the first direction L1 and the second direction L2 form an angle. By appropriately adjusting the reflecting surface of the light-reflecting component 12, the first direction L1 can be perpendicular to the second direction L2.

Figure 3:
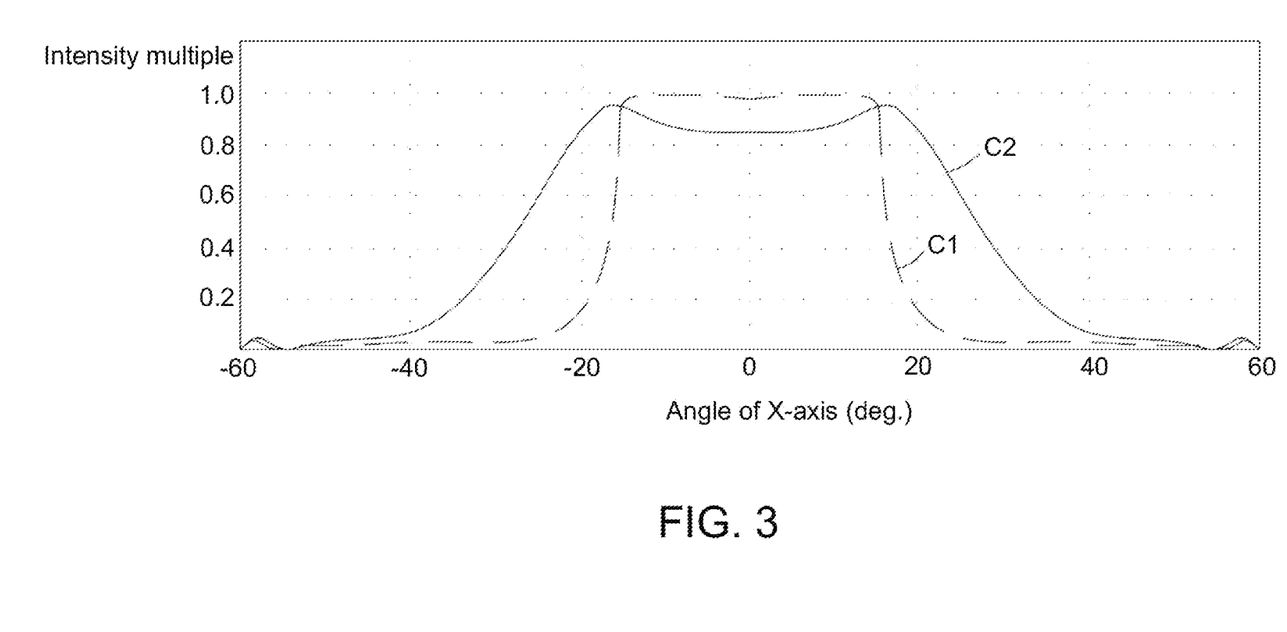
FIG. 3 is a schematic diagram showing the comparison between the light intensity of the time-of-flight camera of the first embodiment and the light intensity of a conventional time-of-flight camera.

In this embodiment, the light source component 11 could be a laser chip, such as a vertical-cavity surface-emitting laser chip (VCSEL), and the base plate 14 could be, for example, a ceramic base plate. The light-diffusing component 13 could be an optical film with a plurality of particles dispersed inside, by which the light can be scattered to generate uniform intensity light. The light-diffusing component 13 could also be an optical film with a plurality of microstructures inside, for example, a tapered bump microstructure, by which the light can be refracted or reflected in different directions to diffuse. The beam angle of the first light B1 is between 22 and 26 degrees. After being diffused by the light-diffusing component 13, the beam angle of the second light B2 can be in the range of 45 to 60 degrees. FIG. 3 shows the relationship between the light intensity multiples of the emitted light of the time-of-flight camera of this embodiment and the camera of prior art in the horizontal direction (X-axis) and the angle range. The curve C1 represents the distribution of the light intensity multiples of the time-of-flight camera of prior art in the horizontal direction (X-axis), and the curve C2 represents the distribution of the light intensity multiples of the time-of-flight camera of this embodiment in the horizontal direction (X-axis). As shown in FIG. 2, the light of the time-of-flight camera of the prior art is concentrated in the range of ±20 degrees of the horizontal direction. However, after the light of the time-of-flight camera of this embodiment is uniformized by the light-diffusing component 13, the range of the light distribution is expanded to a range of ±40 degrees though the light intensity in the center (0 degrees) is just slightly weakened.

Back to FIG. 2, in this embodiment, the light-reflecting component 12 comprises a base 121 and a prism 122. The prism 122 could be, for example, a right-angle cone prism, of which the hypotenuse (reflective surface) is configured to be on an inclined surface of the base 121. The first light B1 is incident on one side surface of the prism 122, and after being reflected by the reflective surface, the first light B1 exits the prism 122 from the other side surface of the prism 122 and becomes a second light B2, allowing the direction of light incident on the prism 122 to be perpendicular to the direction of light exiting from the prism 122. In another embodiment, the light-reflecting component can also include a base and a reflecting mirror. The reflecting mirror can reflect the first light B1 traveling in the first direction L1 to make it travel in the second direction L2.

After arriving at the object to be measured, the second light B2 is reflected to form a third light B3. The third light B3 is then received by the light-receiving module 20 after passing through the light-receiving opening 34. The light-receiving module 20 comprises an optical lens component 21 and a light-sensing component 22. After entering the light-receiving module 20, the third light B3 is imaged on the light-sensing component 22 through the optical lens component 21, and each of the pixels of the light-sensing component 22 would generate a corresponding image data to be transmitted to the data processing module 40, which is able to calculate the phase difference between the first light B1 and the third light B3 based on the image data from each of the pixels and the data of the first light B1 of the light source component 11 for the travel time of the light. According to the travel time of the light, the distance of each of the points of the object to be measured corresponding to each of the pixels can be calculated, and the depth information of each of the points of the object to be measured can be further calculated based on the above information to simulate a three-dimensional image. In this embodiment, the light-sensing component 22 could be a CCD or a CMOS, and the data processing module 40 could be a processor and a digital/analog conversion component.

Figure 4:
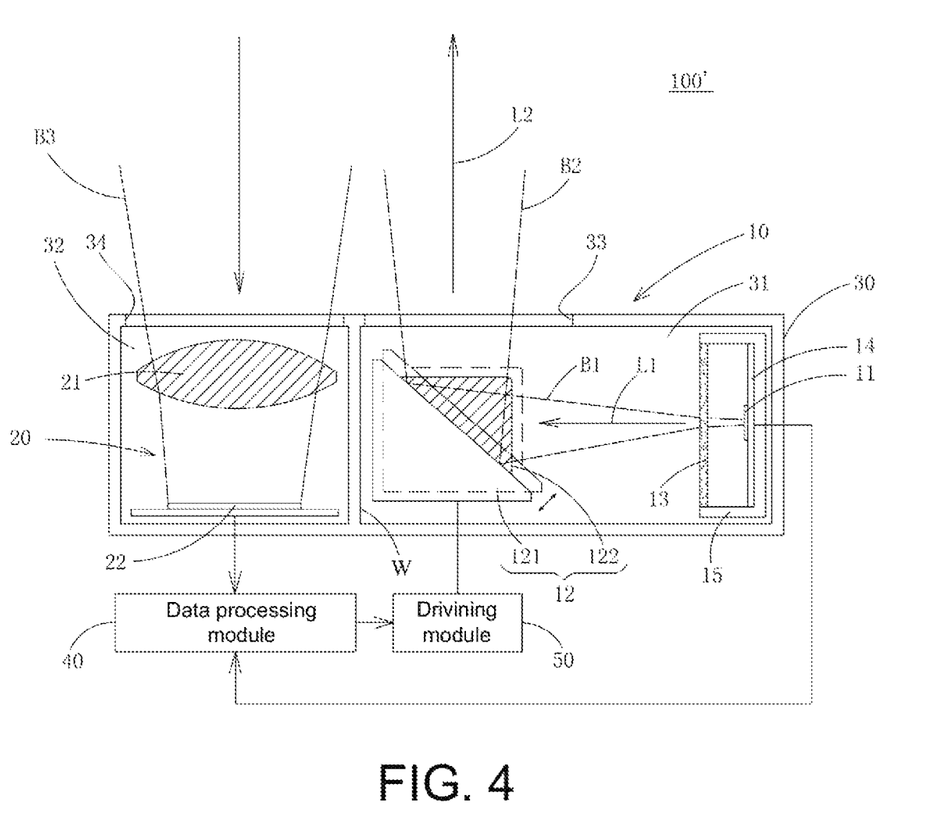
FIG. 4 is a schematic diagram of a time-of-flight camera of the second embodiment of the present disclosure.

FIG. 4 is a schematic diagram of a time-of-flight camera of the second embodiment of the present disclosure. Partial components of this embodiment are identical to those of the first embodiment shown in FIG. 1, the same components are given the same symbols, and descriptions are omitted. The difference between this embodiment and the first embodiment shown in FIG. 1 is that the time-of-flight camera 100' of this embodiment further comprises a driving module 50. The driving module 50 is connected to the data processing module 40 in a manner capable of transmitting signals and is connected to the base 121 of the light-reflecting component 12. The data processing module 40 sends a control signal according to the light-receiving state of the light-sensing component 22, and the driving module 50 receives the control signal from the data processing module 40 to drive the base 121 of the light-reflecting component 12 to move linearly in any direction. In this way, the prism 122 can be moved to change the projecting area of the second light B2, so that the reflected third light B3 could cover the entire light-sensing component 22. In this embodiment, the driving module 50 could be, for example, a stepper motor.

Figure 5:
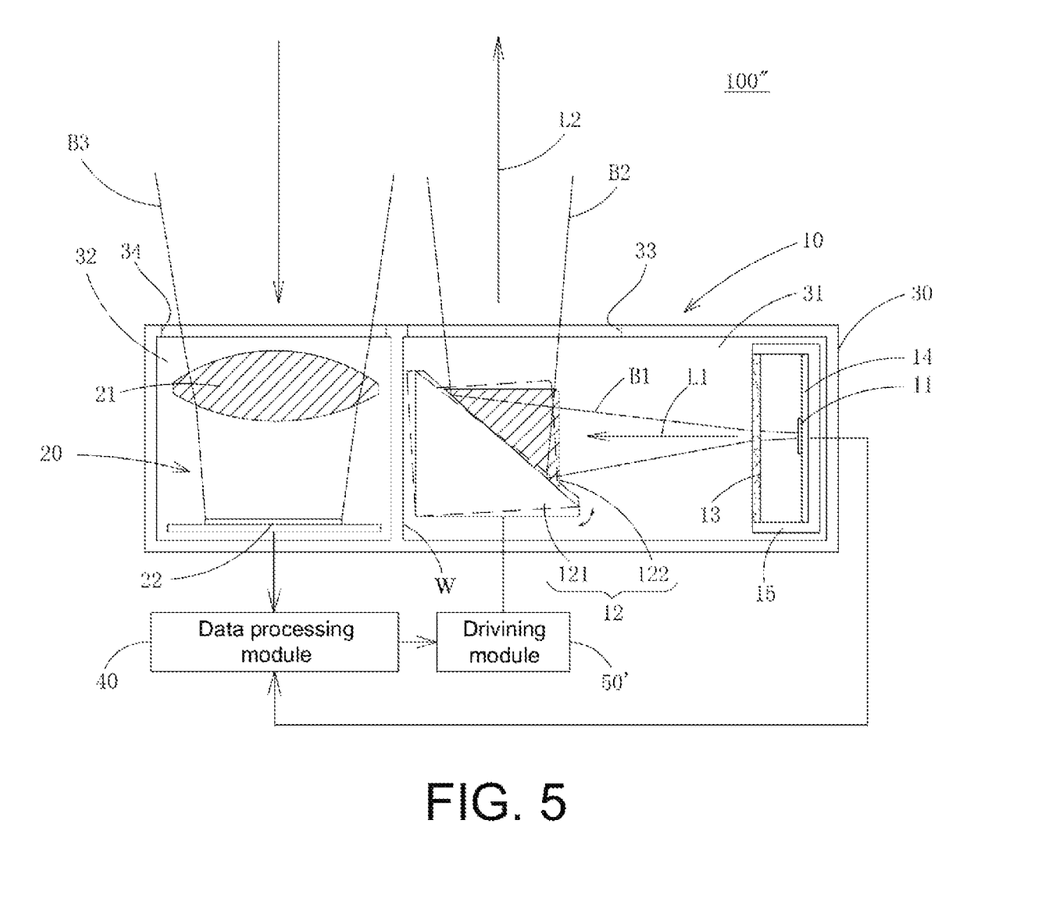
FIG. 5 is a schematic diagram of a time-of-flight camera of the third embodiment of the present disclosure.

FIG. 5 is a schematic diagram of a time-of-flight camera of the third embodiment of the present disclosure. Partial components of this embodiment are identical to those of the first embodiment shown in FIG. 1, the same components are given the same symbols, and descriptions are omitted. The difference between this embodiment and the first embodiment shown in FIG. 1 is that the time-of-flight camera 100" of this embodiment further comprises a driving module 50'. The driving module 50' is connected to the data processing module 40 in a manner capable of transmitting signals and is connected to the base 121 of the light-reflecting component 12. The data processing module 40 sends a control signal according to the light-receiving state of the light-sensing component 22, and the driving module 50 receives the control signal from the data processing module 40 to drive the base 121 of the light-reflecting component 12 to rotate within any range of angle. In this way, the prism 122 can be moved to change the projecting direction and area of the second light B2, so that the reflected third light B3 could cover the entire light-sensing component 22. In this embodiment, the driving module 50' could be, for example, a voice coil motor.

In another embodiment, the driving module could also be a combination of driving module 50 and driving module 50'. That is, the base 121 could be driven to move linearly and rotate so that the prism 122 can be moved to change the projecting direction and area of the second light B2.

Figure 6:
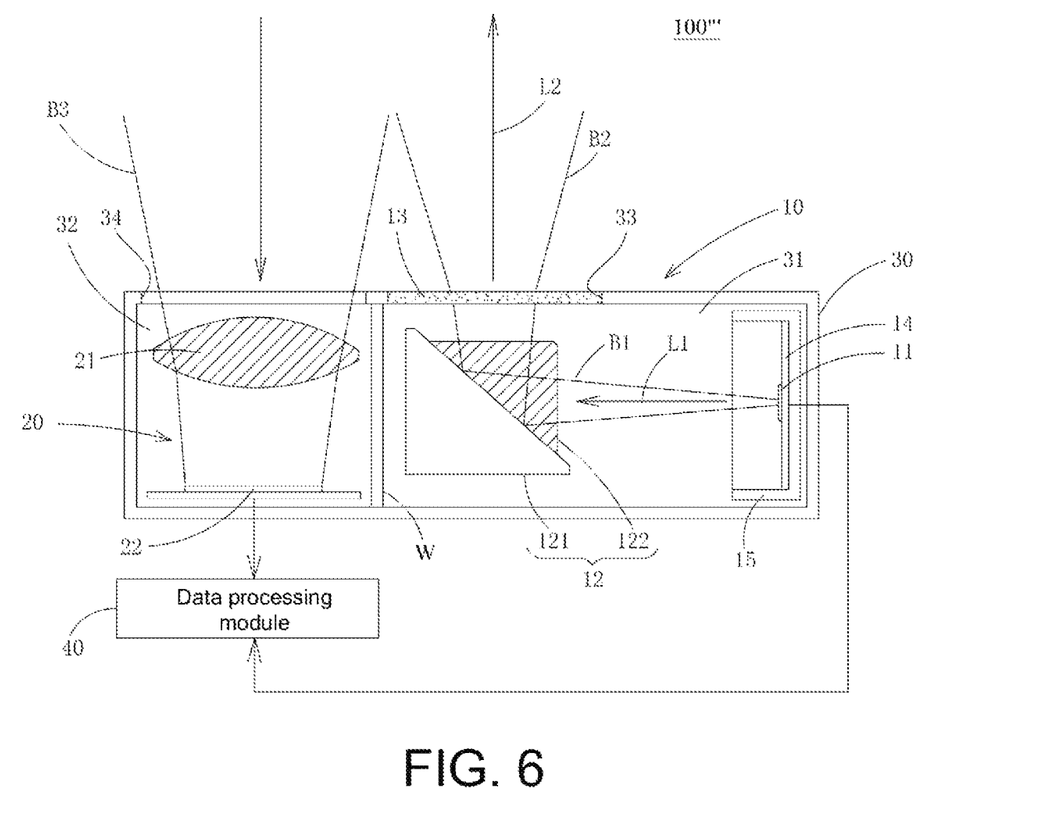
FIG. 6 is a schematic diagram of a time-of-flight camera of the fourth embodiment of the present disclosure.

FIG. 6 is a schematic diagram of a time-of-flight camera of the fourth embodiment of the present disclosure. Partial components of the time-of-flight camera 100''' of this embodiment are identical to those of the first embodiment shown in FIG. 1, the same components are given the same symbols, and descriptions are omitted. The difference between this embodiment and the first embodiment shown in FIG. 1 is that the position of the light-diffusing component 13 of this embodiment is different from that of the first embodiment. In this embodiment, the light-diffusing component 13 is disposed at the light-emitting opening 33 of the housing 30, while the light-diffusing component 13 of the first embodiment is disposed at the opening of the container 15. That is, the light source component 11 emits a first light B1 in a first direction L1. The first light B1 is first reflected by the light-reflecting component 12 and travels in the second direction L2, and then passes through the light-diffusing component 13, to form a second light B2. In this embodiment, the light-diffusing component 13 is on the light path of the first light B1 emitted by the light-emitting module 10, and the first light B1 passes through the light-reflecting component 12 and then passes through the light-diffusing component 13, but the light-diffusing component 13 is not limited to be disposed at the light-emitting opening 33 of the housing 30, as long as it is on the path of the reflected light of the first light B1 reflected by the light-reflecting component 12. The second light B2 passing through the light-reflecting component 12 is also diffused. For example, the beam angle of the first light B1 is between 22 to 26 degrees. After being diffused by the light-diffusing component 13, the beam angle of the second light B2 can be in the range of 45 to 60 degrees.

In summary, embodiments of the present disclosure provide a time-of-flight camera comprising a light-diffusing component diffusing the light emitted by the light source component into light with uniform intensity (amount of light per unit area), thereby increasing the light intensity of the low light area. Thus, objects in farther distance can be measured by the uniformized light. Besides, the time-of-flight camera of the present disclosure can also be applied to a light-emitting module emitting light with a small beam angle for objects in the same distance, presenting measurement results which are the same.

It is to be understood that the term "comprises", "comprising", or any other variants thereof, is intended to encompass a non-exclusive inclusion, such that a process, method, article, or device of a series of elements not only comprise those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A time-of-flight camera, comprising:
a light-emitting module comprising a light source component, a light-reflecting component and a light-diffusing component, the light source component emitting a first light in a first direction, the light-reflecting component and the light-diffusing component being disposed on the light path of the first light, a second light formed by the first light passing through the light-reflecting component and the light-diffusing component, the second light traveling toward a second direction to an object to be measured, the object to be measured reflecting the second light, the first direction being intersecting with the second direction; and
a light-receiving module receiving the reflected second light and performing the function of sensing;
wherein the light-diffusing component is disposed between the light source component and the light-reflecting component and corresponds to a light-reflecting surface of the light-reflecting component the first light is reflected by the light-reflecting component to generate the second light traveling in the second direction after passing through the light-diffusing component.

2. The time-of-flight camera according to claim 1, wherein the light-reflecting component comprises a prism.

3. The time-of-flight camera according to claim 2, further comprising a light reflection driving mechanism; the light reflection driving mechanism is connected to the light-reflecting component and drives the light-reflecting component to move.

4. The time-of-flight camera according to claim 1, further comprising a light reflection driving mechanism; the light reflection driving mechanism is connected to the light-reflecting component and drives the light-reflecting component to move.

5. The time-of-flight camera according to claim 4, wherein the light reflection driving mechanism drives the light-reflecting component to move linearly.

6. The time-of-flight camera according to claim 4, wherein the light reflection driving mechanism drives the light-reflecting component to rotate.

7. The time-of-flight camera according to claim 1, wherein the beam angle of the first light is between 22 and 26 degrees.

8. The time-of-flight camera according to claim 7, wherein the beam angle of the second light is between 45 and 60 degrees.

9. The time-of-flight camera according to claim 1, wherein the light source component is a vertical-cavity surface-emitting laser.

* * * * *